Patented Dec. 29, 1936

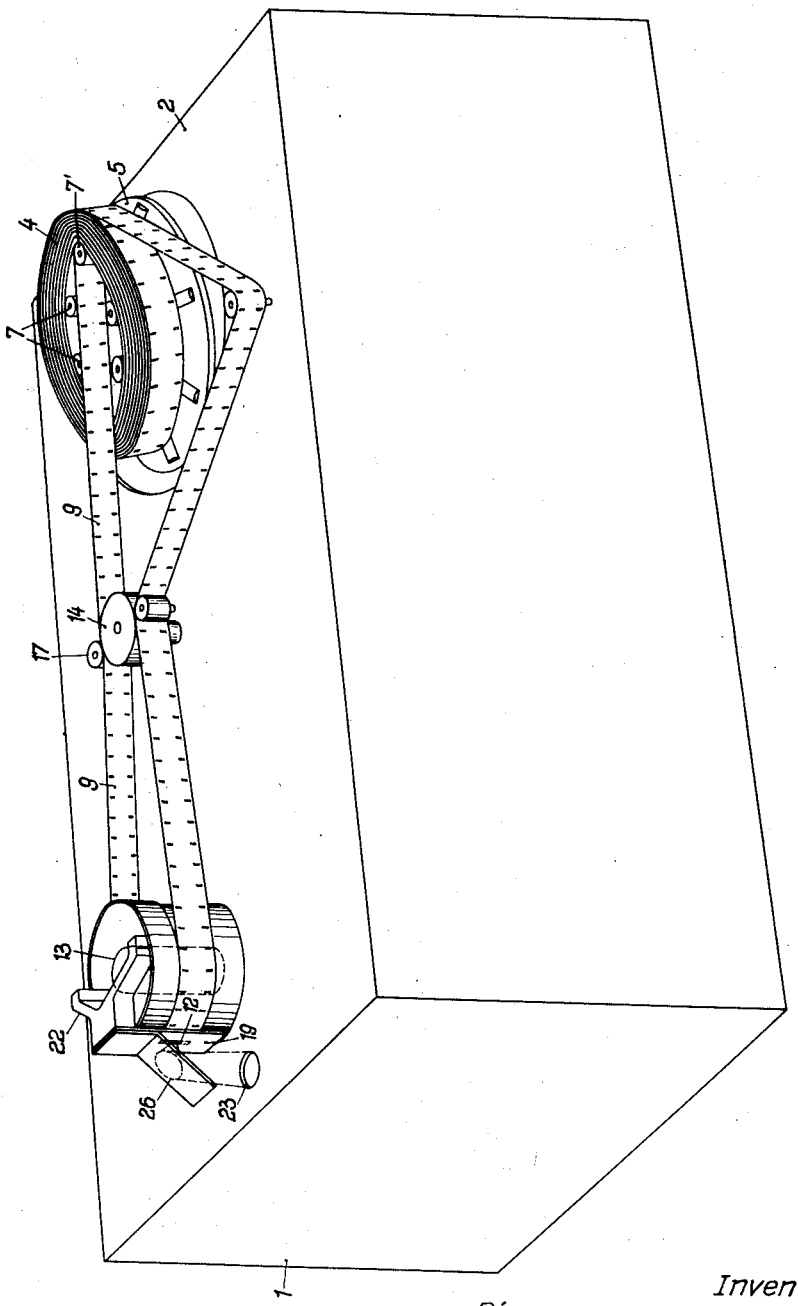

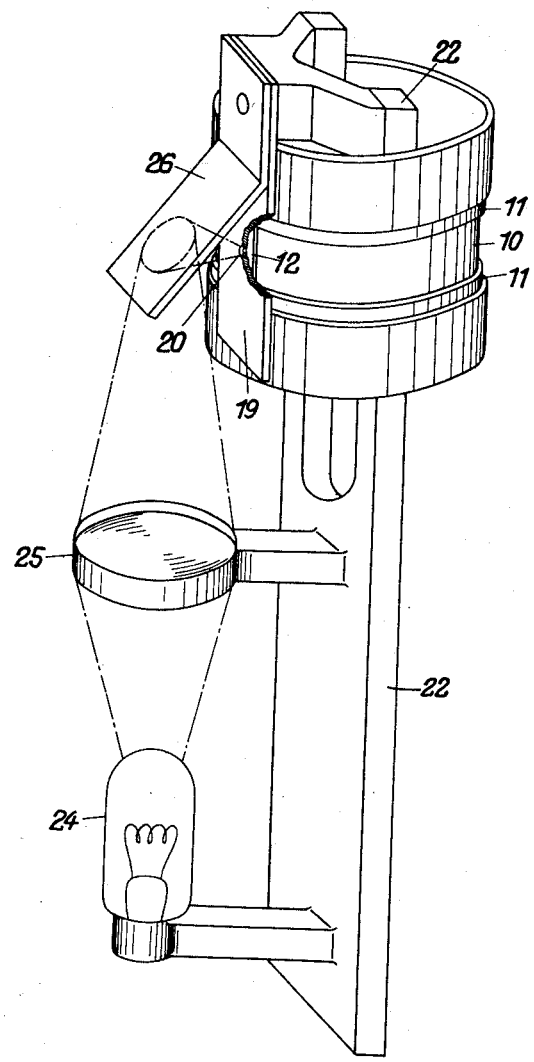

2,065,954

UNITED STATES PATENT OFFICE 2,065,954

APPARATUS FOR REPRODUCING SOUND FROM AN ENDLESS BAND OF PHOTOGRAPHIC FILM

Dénes von Mihaly, Berlin-Wilmersdorf, Germany

Application March 21, 1935, Serial No. 12,324
In Germany March 21, 1934

5 Claims. (Cl. 179—100.3)

My invention relates to apparatus for reproducing sound from a film record.

There are known apparatus for reproducing sound from an endless band of photographic film in which the sound record is in the form of a plurality of parallel tracks on the film, which tracks are successively traversed by the reproducing light beam, the light beam being shifted transversely of the film in order to constantly register with successive portions of the sound record. The narrow light beam traversing the sound tracks for reproducing them was produced either by the reduced projection of an illuminated slit onto the film, or by direct illumination of the film through a slit of a width of about 0,02 mm. arranged immediately before the film.

The first mentioned method has the disadvantage, that it involves the employment of complicated and expensive micro-optical means which cause high light-losses, particularly when the sound is recorded on narrow film, due to the extremely little dimensions of the elements of the sound record. For compensating these losses, either the sound track has to be made very broad so that only a few tracks can be placed upon the film, or the weak currents of the photoelectric cell have to be amplified very strongly by using an expensive amplifier of many stages.

The second method has the disadvantage that the narrow slit causes diffraction of the light beam so that the really illuminated portion of the sound track is wider than the slit itself, and in consequence thereof the high sound frequencies are entirely suppressed while the medium frequencies are reproduced distortedly. Moreover the slit of the known apparatus has been frequently clogged by the dust adhering to the surface of the film since with regard to the necessary extremely little distance between the slit and the film it was not possible to protect the slit against occasional direct contact with the film.

However, in reproducing sound tracks recorded side by side on a film there is a further difficulty arising from the fact that in this case besides the sound selecting slit another opening is necessary for limiting the light beam in direction transversely of the film to the desired sound track. Although the width of this opening is not so minute as that of the slit, still it does not exceed 1, 5 mm. Since the selecting slit is between this opening and the film, and as the mask containing the opening has to be provided with guides to enable to shift it transversely of the film, its distance from the film can not be made less than 2-3 mm. However, at this distance even this comparatively wide opening causes a considerable diffraction of the light beam and in consequence thereof the film parts adjoining the sound track are also illuminated whereby a strong ground noise is caused. This drawback could be eliminated by reducing the width of the opening as compared to the width of the sound tracks, but thereby further light losses would be caused, and the amplification of the photo-electric currents would have to be increased further.

The object of this invention is to provide an apparatus of the above described type with direct illumination of the film, in which the drawbacks caused by the diffraction of the light beam by the sound selecting slit as well as by the track selecting opening are eliminated.

Another object of the invention is to arrange said slit and said opening each at one side of the film in close proximity to it.

A further object of the invention is to arrange the track selecting opening between the light source and the film, and the sound selecting slit between the film and the photoelectric cell. Here, the track selecting being in close proximity to the film, the whole light traversing this opening is limited exactly to the sound track so that no ground noise is caused; moreover, the sound selecting slit being behind the film the light diffraction caused by it does not act upon the film but only upon the photoelectric cell where it is harmless. The very good efficiency of the arrangement according to the invention combined with the clearness of the sound reproduction obtained by it enable to use very narrow sound tracks (down to 0,1 mm. instead of the normal 1,5-2,5 mm.), and to provide accordingly a great number of sound tracks even on narrow film bands.

In the accompanying drawings the invention is illustrated by way of example.

Referring to the drawings, Fig. 1 is a perspective view of the apparatus; and Fig. 2 is a detail thereof drawn to a slightly larger scale.

The housing 1 contains the motor for driving the film as well as the means for shifting the reproducing light beam in a direction transversely of the film. In the base plate 2 forming the cover of the housing 1 is at one end a circular hole 3 in which the plate 5 carrying the film coil 4 is mounted in such manner that its plane is inclined with respect to the plane of the base plate 2. The coil is supported by freely rotatable rollers 6 radially arranged on the plate 5; and also freely rotatable guide rollers 7 are provided for holding the coil in position on the plate 5.

On the other end of the base plate 2 a drum 8 is mounted. Between the film coil 4 and the drum 8 a sprocket 14 is provided which is mounted upon the axis of the motor being arranged within the housing 1, and is driven by the motor. On both sides of said sprocket 14 spring supported pressing rolls 17 are provided. The endless band of film 9 is withdrawn from the inside of the coil 4 over the roller 7' by the one side of the sprocket 14, is then led round the drum 8 to the other side of the sprocket 14 and past the guide roller 18, and it winds up on the outside of the coil 4.

The drum 8 is provided with a groove 10 of a width equal to the width of the film. On both sides of this groove two slightly raised guides 11 for the film are provided; and within the groove 10 a vertical slit 12 is arranged, the width of said slit being about 0,2 mm., and its length being equal to the useful width of the film. Within the drum 8 a photoelectric cell 13 is mounted, said cell being connected in known manner to an amplifier and to a loudspeaker.

Before the drum 8 there is a mask 19 the opening 20 of which stands exactly opposite the slit 12. The diameter of this opening 20 is substantially equal to the width of any of the sound tracks on the film. The mask 19 is fastened to a frame 22 which is vertically shiftable along guides provided within the drum 8. A light source 24, f. e. an incandescent lamp, and a condenser lens 25 are secured to the lower part of the frame 22, while the mask 19 is carrying an inclined mirror 26. The light of the light source is concentrated to a light beam by the lens 25 and falls through the opening 23 of the base plate 2 upon the inclined mirror 26 by which it is reflected through the opening 20 and the slit 12 upon the film 9, and through the sound tracks of the film onto the photoelectric cell 13.

The frame 22 and with it the light beam traversing the opening 20 are moved by suitable means arranged within the housing 1 in such manner transversely of the film, that the sound tracks on the film be reproduced by the light beam successively while the film is repeatedly moved past the light beam.

The film being guided next to the slit 12 along a circular path is firmly pressed against the projecting guides 11 of the drum 8, and thereby it is kept in the constant distance of about 1/100 mm. from the slit 12. Thus the sounds are selected with the highest precision and on the other hand the slit is protected from being clogged by direct contact with the film. The means employed for constantly keeping the necessary minute distance between the film and the slit are very simple and cheap because the groove of a depth of 1/100 mm. can easily be made by turning.

It is advantageous to use a lens with such focal distance that the image of the light source be obtained by it in the space between the slit and the photocell, so that the slit be traversed by a still convergent light beam. In order to secure the fulfillment of this condition in any position of the opening 20 the light source and the condenser are, as described, moving together with the mask 19 so that the length of the optical center line between the light source and the slit 12 is not altered by lifting or lowering the opening 20.

Having now particularly described and ascertained the nature of my invention and in what manner the same is to be performed I declare that what I claim is:

1. In apparatus for reproducing sound from an endless band of photographic film having a plurality of parallel sound tracks, a photoelectric cell, and means for directing a narrow light beam through the film onto the photoelectric cell, said means including a narrow sound selecting slit arranged between the film and the photoelectric cell, said slit limiting the light beam in the longitudinal direction of the film to a dimension sufficiently small for reproducing sound, and extending across the full width of the film, and an opaque mask shiftable transversely of the film in a plane parallel to the plane of the film and having an opening for limiting the light beam to one of the sound tracks, said mask being arranged between the film and the light source, said slit and said mask being in close proximity to the film.

2. In apparatus according to claim 1, a drum, a photoelectric cell within said drum, a groove in the wall of said drum, said sound selecting slit extending in parallel to the axis of said drum in the grooved part thereof, and slightly raised guides for the film on both sides of said groove.

3. In apparatus according to claim 1, a light source, and a condenser lens for focusing the light beam from said source upon said sound selecting slit, said light source, said lens, and said mask being mounted for simultaneous shifting movement in a direction transversely of the film.

4. In apparatus according to claim 1, a light source, a condenser lens for focusing the light beam from said source upon said sound selecting slit, and a common support for carrying said light source, said lens, and said mask, said support being mounted for shifting movement in a direction transversely of the film.

5. In apparatus according to claim 1, a light source, and a condenser lens adapted to produce the image of said light source in the space between said slit and said photoelectric cell.

DÉNES von MIHALY.